United States Patent [19]

Rogers et al.

[11] Patent Number: 4,893,242

[45] Date of Patent: Jan. 9, 1990

[54] VEHICLE BRAKE TEST SYSTEM

[75] Inventors: John N. Rogers; James M. Lady; Donald W. Bilsbarrow; Rene S. Trujillo, all of Tucson, Ariz.

[73] Assignee: United Technologies Corporation, Hartford, Conn.

[21] Appl. No.: 137,686

[22] Filed: Dec. 24, 1987

[51] Int. Cl.$^4$ .......................... G01L 5/28; G06F 15/20
[52] U.S. Cl. .................................. 364/426.01; 73/126; 73/132
[58] Field of Search ................. 364/426.01; 340/52 B, 340/454; 73/121, 123, 126, 131, 132

[56] References Cited

U.S. PATENT DOCUMENTS

| | | | |
|---|---|---|---|
| 3,899,916 | 8/1975 | Cline | 73/126 |
| 3,974,688 | 8/1976 | Cline | 73/126 |
| 3,982,429 | 9/1976 | Cline | 73/126 |
| 4,024,756 | 5/1977 | Cline | 73/132 |
| 4,520,444 | 5/1985 | Koos | 364/426.01 |

Primary Examiner—Gary Chin
Attorney, Agent, or Firm—Dominic J. Chiantera

[57] ABSTRACT

A brake test method measures the brake force per axle of a vehicle by having an operator linearly depress the vehicle brake pedal while the axle's left and right wheels positioned on torque motor driven, constant speed rollers. The roller drive torque magnitude is periodically sampled and the samples are filtered to remove ovality discontinuities, the left and right side filtered samples are then compared to detect the maximum brake force imbalance.

2 Claims, 3 Drawing Sheets

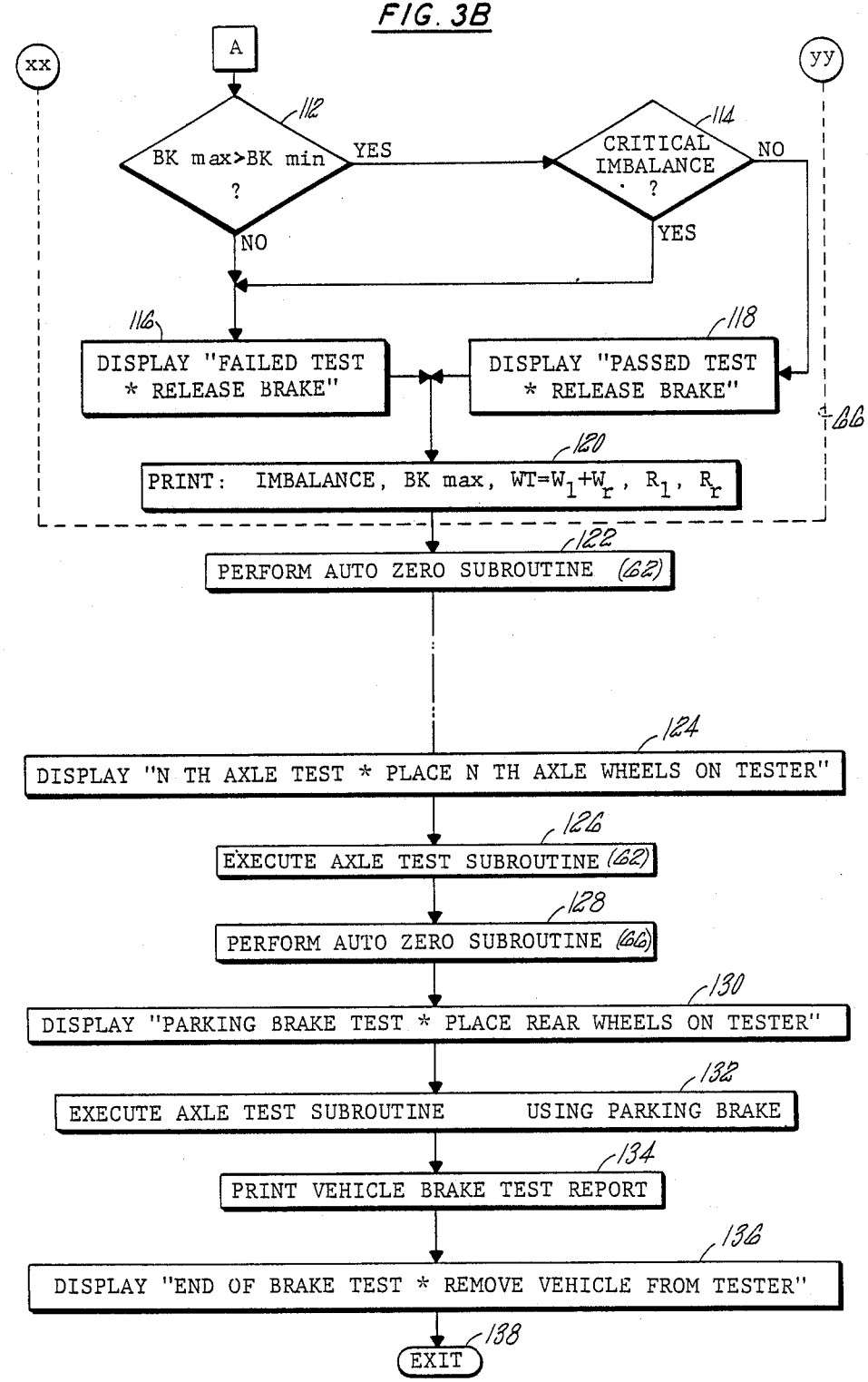

VEHICLE BRAKE TEST SYSTEM

TECHNICAL FIELD

This invention relates to the automotive safety testing, and more particularly to automated safety lane testing of motor vehicle brake force and brake imbalance.

BACKGROUND ART

It is generally accepted that brake system defects are responsible for a high number of automobile accidents. Results published by the Department of Transportation (Report No. DOT-HS-034-3-535-77-TAC; Mar. 31, 1977) indicate that a motor vehicle's braking system is the single highest cause of motor vehicle accidents.

Analysis by the Indiana University Institute for Research in Public Safety of the accidents reported for the five year period covered by the report (1972-77) indicate that the vehicle's braking system was "definitely" (95% confidence level) at fault in 2.9% of the accidents, "probably" (80% confidence level) at fault in 5.2% of the accidents, and "possibly" (20-80% confidence level) at fault in close to 20% of the accidents.

As evidence of state government concern, brake inspection and testing is given the highest priority in the various state motor vehicle inspection (MVI) programs. Due to the high volume of safety lane traffic, however, only a "full braking" dynamic performance test is used to determine MVI performance as opposed to visual inspection of the vehicle brake pads after removing the wheel ("wheel-pull inspection"), or a road test. Although wheel-pull or road test provide a much more quantitative result, they consume excessive inspection time and increase inspection costs.

The full brake test measures the vehicle's stopping power. Typically the vehicle's wheels are placed on a constant speed, torque motor driven pair of rollers. The brakes are applied and the magnitude of the torque drive required to rotate the rollers with the brakes applied is used as the indication of vehicle brake force. While this provides an excellent indication of stopping power it does not provide accurate measurement of the brake force imbalance between wheels on a common axle of the vehicle.

As known, brake imbalance causes a vehicle to swerve in hard stops, or to skid on slick road surfaces. The most significant cause of inaccurate measurement of brake imbalance in the prior art test procedures is the loss of brake shoe-to-drum, or brake pad-to-disc, contact as the wheel rotates. This is due to the out-of-roundness of the brake drum or to undulations in the disc surface. This unevenness characteristic is generally referred to as brake "ovality", which is defined as that effect which produces inconsistencies on a normal brake force curve. This masks the true imbalance magnitude.

DISCLOSURE OF INVENTION

The object of the present invention, is to provide a brake test method capable of coincident measurement of brake system ovality and maximum brake force. Another object of the present invention, is to provide apparatus for measuring the vehicle's full axle applied brake force versus time, to detect the point of maximum left side to right side brake force imbalance.

According to the present invention, the brake force of each of the vehicle's axles are tested, one axle at a time, by operator application of the brakes linearly over a test time interval with the axle's left and right side wheels positioned on separate pairs of constant speed rollers, the rollers being driven by a torque motor which increases drive torque to the rollers as necessary to maintain a constant speed in the presence of applied brake power, the drive torque magnitude of the left and right side torque motors is sampled periodically throughout the test time interval and the samples are filtered to remove any ovality discontinuities, the left and right side filtered sampled values are then compared to detect the point of maximum brake force imbalance.

These and other objects, features and advantages of the present invention will become more apparent in light of the detailed description of a best mode embodiment thereof, as illustrated in the accompanying Drawing.

BRIEF DESCRIPTION OF DRAWING

FIG. 3B is a continuation of the flow chart diagram of FIG. 3A.

BEST MODE FOR CARRYING OUT THE INVENTION

Figure 1:
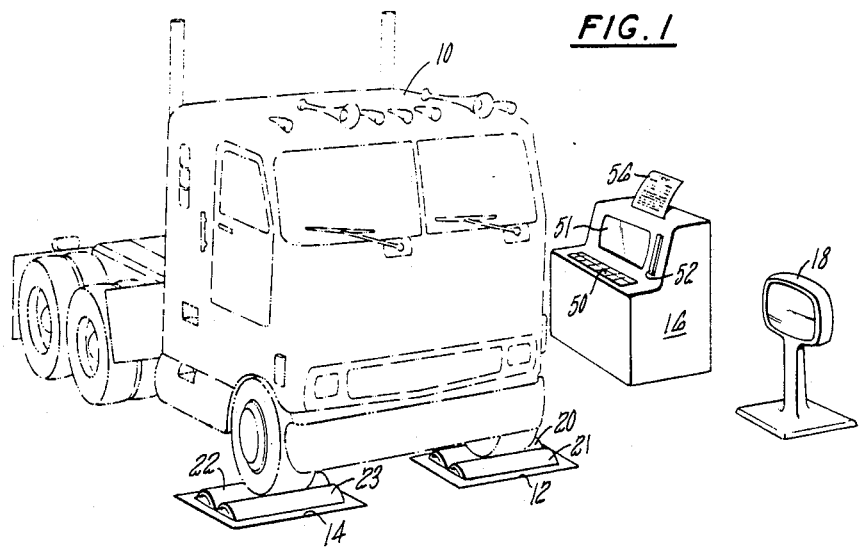
FIG. 1 is a perspective illustration of a vehicle dynamic brake test station in which the present invention may be used.

FIG. 1 illustrates a typical safety lane test station in which the present brake test procedure may be used. It should be understood that although the present invention may be implemented in a safety lane inspection facility, it is not so limited. It may be used in a repair garage for diagnostic repair of vehicle brake systems, or for testing fleet vehicles. The vehicles tested may be of any class; automobile, trucks, or motorcycles, with only the incidental hardware being subject to change to accommodate the different physical size of vehicles to be tested.

In FIG. 1 the test vehicle 10 is shown to be a tractor type truck. The test lane apparatus includes left and right (as viewed from the driver's seat) brake test equipment 12,14, a test console 16, and an annunciator 18 which is used to display messages to the operator/driver during the test sequence. Depending on the specific safety lane facility, the brake test station may be one of a number of such test stations in the line, all connected via a local terminal (or personal computer) to a host computer which may supervise the various lane stations, and which manages and stores the sampled test data. In the present discussion it is assumed that the brake test station is standalone in operation.

Figure 2:
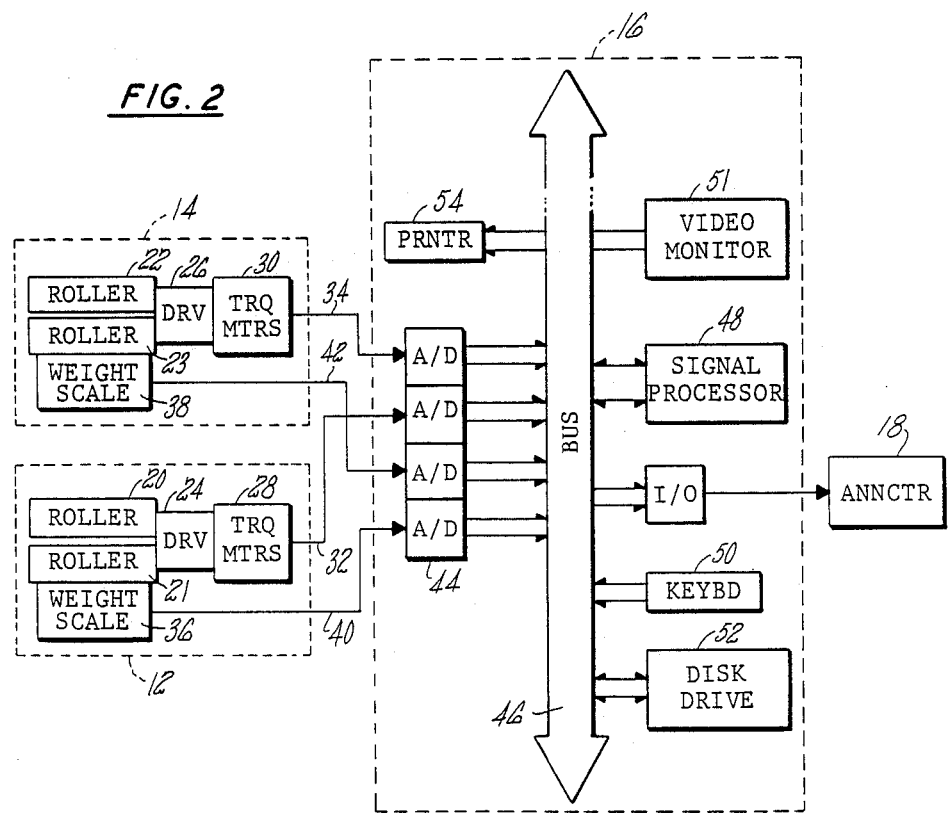
FIG. 2 is a schematic block diagram of the apparatus used in performance of the brake test of the present invention.

FIG. 2 is a schematic block diagram of the test station equipment shown in FIG. 1. Referring to both FIGS. simultaneously, the brake test equipment is of a type known in the art, such as the Model IW2A Dynamic Roller Brake Tester manufactured by Maschinenbau Holdenwans GmbH of West Germany. It should be understood, however, that any equivalent tester deemed suitable by those skilled in the art, may also be used. The testers 12, 14 each include a pair of rollers 20, 21 and 22, 23, respectively, each with a 202 millimeter (mm) diameter and a 2.2 meter (m) track. They are driven through gear trains 24, 26 by two 4 kilowatt (kw) (5.5 horsepower) torque motors 28, 30. The torque motors drive the rollers at a nominally constant 5 kilometer/hour (km/h) test speed for a brake force test range of 0–6 kilo-newtons (kn). The signal magnitude of the motor output torque is provided from each tester on lines 32, 34 to the console 16. Although not shown, the torque signal magnitude may also be displayed on an analog meter for operator viewing.

Figure 3A:
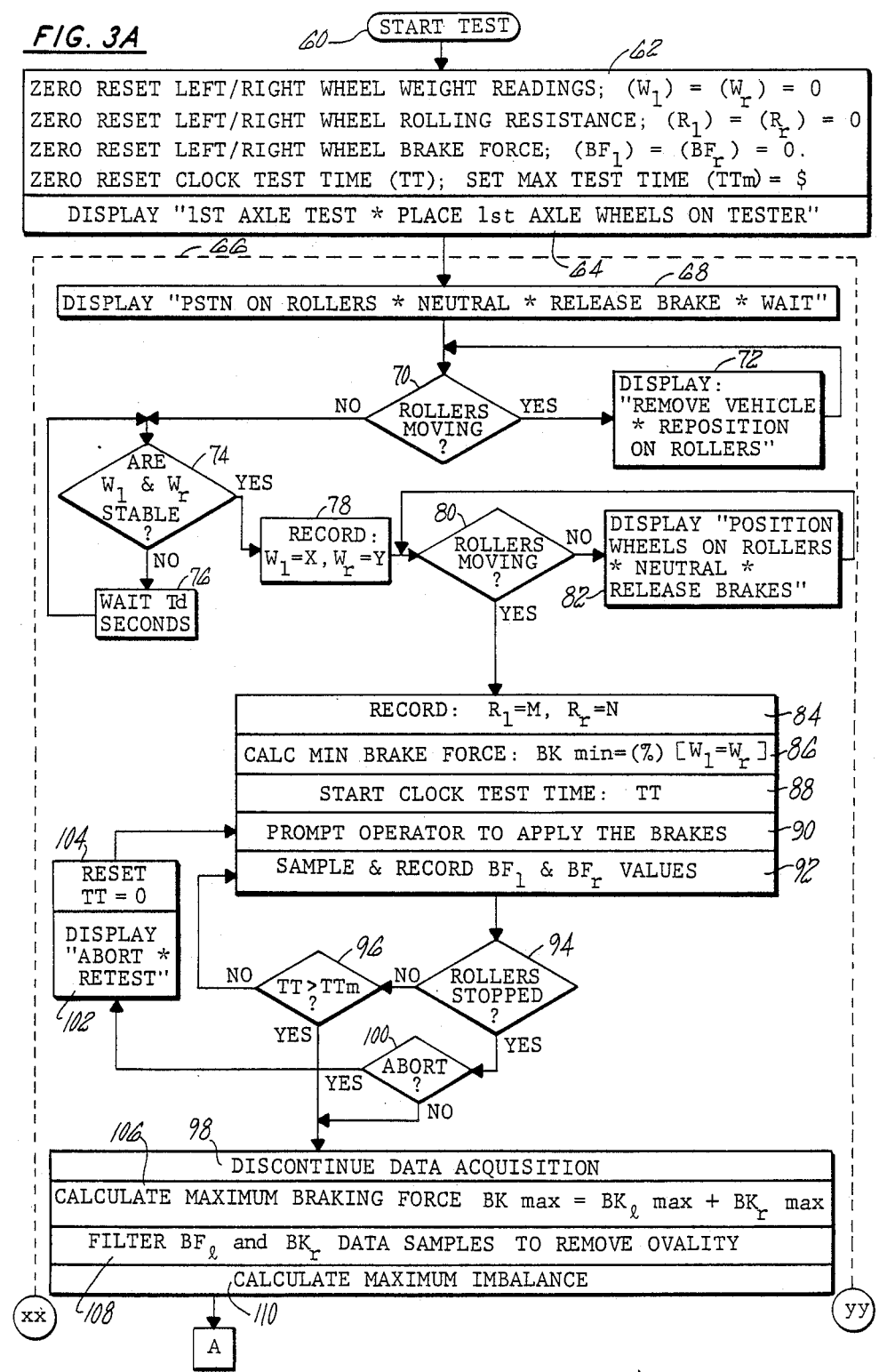
FIG. 3A is a flow chart diagram of the brake test procedure of the present invention.

Each brake tester includes one or more weight scales 36, 38 placed beneath the roller assembly such that the scales may respond to, and measure the applied axle weight. The scales are typically strain gauge type. With the vehicle's front wheels placed on the rollers the scales provide the weight measurement in the form of left and right side axle weights ($W_l$ and $W_r$) on lines 40, 42 to the console. The sampled weight values may then be summed to provide a total axle weight which, as described hereinafter with respect to the flow chart of FIGS. 3A, 3B, is used to determine minimum acceptable brake force.

The console 16 receives the torque and weight analog signals from the testers in a multi-channel analog-to-digital (A/D) converter 44, such as an 8 channel ADV11-C A/D. The converter provides the digital signal equivalent of each analog signal magnitude to the console main bus 46 where it is accessed by a signal processor 48. The processor may be any of a number of known type personal computers (PCs), with a keyboard 50, a video monitor 51, at least one disk drive 52, with suitable kilobyte (kb) of RAM and ROM storage. In a best mode embodiment the processor is an IBM Model PC AT, or equivalent.

Also included within the console and connected to the bus is a printer 54, which is a known type such as a Model FX-86e dot matrix printer manufactured by the EPSON Corporation. The printer is an option for use when there is a requirement for providing hard copy print out 56 (FIG. 1) of the brake test results. An input-/output (I/O) interface 58 connects the console bus to the annunciator 18.

In operation, each axle of a vehicle is tested one at a time. Each test measures left-side and right-side: axle weight ($W_l$, $W_r$), rolling resistance ($R_l$, $R_r$), and brake force ($BF_l$, $BF_r$) The brake force is measured by fixed frequency sampling each side over a test time (TT) interval as the test operator applies the brakes. From the sampled values, the signal processor calculates the imbalance between left and right side brake force for each axle, and determines the maximum sampled brake force value. A pass/fail determination is made immediately, announced (on the annunciator) and the test results are printed in hard copy.

Referring now to FIG. 3A, the signal processor enters the present brake test program routine on operator command at START 60, and instructions 62 require auto zero of all registers to erase prior test results. This includes the weight, rolling resistance, and brake force registers, as well as reseating the brake test clock to zero and the maximum brake test time interval (TTm) to a selected value ($).

Instructions 64 display "1ST AXLE TEST * PLACE 1ST AXLE WHEELS ON TESTER" on the annunciator 18 for a selected time interval, after which the computer enters the axle test sub-routine 66. The sub-routine 66 performs the entire brake test for each axle, and is activated only with actuation of the rollers (20–23). The rollers, normally static, are actuated in response to placement of the vehicle wheels on the testers. Instructions 68, the first of the sub-routine, display the annunciator message "POSITION ON ROLLERS * NEUTRAL * RELEASE BRAKE * WAIT".

The vehicle front axle is driven onto the tester; the brakes and steering are released, and the transmission is shifted into neutral. The rollers start turning after an approximate 10 second delay. During this delay the axle weight is measured.

Decision 70 determines if the rollers are moving. If they are moving the weight cannot be measured. A YES answer causes instructions 72 to display the message: "REMOVE VEHICLE * REPOSITION ON ROLLERS", and the routine branches back to decision 70. A NO answer is followed by decision 74 which determines if the weight scale readings are stable. If NO, instructions 76 produce a Td delay then branch back to decision. This continues until a YES answer is received.

When the scales are stable, instructions 78 record the left and right weight values $W_l$, $W_r$, after which decision 80 determines if the rollers are yet turning. If NO, instructions 82 display the message: "POSITION WHEELS ON ROLLERS * NEUTRAL * RELEASE BRAKES", and branch back to decision 80. When the rollers begin moving, a YES answer begins the data acquisition routine.

The rolling resistance of the left and right wheels ($R_l$, $R_r$) are measured in instructions 84. This is done prior to prompting the driver to apply the brakes, and provides an indication of "wheel drag" i.e. bearing performance, sticking brakes. Although not shown, there may be a separate pass/fail of the vehicle based on too high of a measured rolling resistance value; typically 500 newtons. This would abort the test and remove the vehicle for a visual check.

Instructions 86 next calculate the minimum required braking force for the vehicle based upon the total axle weight measured. This represents the pass/fail criteria, and is fixed as a selected percentage of the total weight; typically 60%, based on a conversion factor of 4.45 newtons/lb. The calculated minimum brake force value (BK min) is stored in memory. Next, instructions 88 start the test time interval, instructions 90 prompt the driver to apply the brakes, and instructions 92 begin the sample and recording of the left and right brake force values ($BF_l$, $BF_r$) on lines 32, 34 (FIG. 1) from the brake testers 12, 14.

The brake force values are sampled at a fixed sample frequency (samples/second). Following each sample, decision 94 determines if the rollers are stopped. If the answer is NO, decision 96 determines if the real time test interval (TT) has exceeded the maximum value (TTm). If the answer to 96 is YES, the routine proceeds to instruction 98 to discontinue data acquisition. If the answer to 96 is NO, the routine branches back to 92 for the next date sample. If decision 94 is YES, decision 100 determines if an abort condition has occurred.

An abort condition occurs when the rate of change of either the left or right braking force is too great. In order for the brake force data to be valid, the operator must apply the brakes gradually. If decision 100 is NO, instruction 98 again discontinues data acquisition. If YES, instruction 102 displays the message "ABORT * RETEST", and instruction 104 resets the test timer TT to 0. The routine then branches back to instruction 90 to restart data acquisition. The data sampling continues until either the rollers stop or the time expires.

Following the completion of data acquisition in instruction 98, instruction 106 calculates the maximum total braking force for the axle. Instruction 108 filters the plurality of (Q number of) BK samples obtained for each wheel (left=$BK_l$ and right=$BK_r$), to remove the ovality characteristic so that it will not affect the calculation of the maximum imbalance (instruction 110). The fixed sample frequency, the known constant speed of the rollers, and the known tire circumference, permit use of the following filter algorithm:

For i=1 to Q:

$$BK_i ave = \frac{\sum_{n=i-K/2}^{n=i+K/2} BK_n}{K}$$

Where:

$BK_i$ ave = The filtered value for sample $BK_i$ K=The number of sampled pairs of coincident torque signal magnitudes per tire revolution Instruction 110 calculates the maximum imbalance between brake force values obtained for the left and right wheels as:

$$\text{Maximum Imbalance} = \text{The maximum value of the following equation for } i = 1 \text{ to } Q$$

$$\frac{\text{Delta}\_BK_i}{BF_{max}} \cdot \left[\frac{BF_{max}}{BK_i}\right]^{\frac{1}{2}}$$

where:
$BK_i = BK_l i + BK_r i$ for sample i
$BF_{max}$ = The maximum value of $BK_l i + BK_r i$ for i=1 to Q
$Delta_{13}$ BK = The slope (rate of change) for $BK_i$
The coefficient $$\left[\frac{BF_{max}}{BK_i}\right]^{\frac{1}{2}}$$

weights" the imbalance of braking forces near the low end of the braking force scale differently than those near the maximum braking force.

This calculation is performed on the filtered BK value set, thereby limiting the effects of ovality and providing a quantitative measure of brake imbalance for the axle.

The axle test subroutine 66 next analyzes the test results to determine pass/fail status of the vehicle brake force and brake imbalance. Decision 112 (FIG. 3b) determines if the maximum measured braking force is greater than or equal to the minimum brake force (BK min) value calculated in instruction 86. Decision 114 determines the presence of a critical imbalance; typically a 20% difference in brake force between wheels.

A NO answer to decisions 112, or a YES answer to decision 114, causes instructions 116 to display the message: "FAILED TEST * RELEASE BRAKE" on the annunciator. Similarly, YES answers to decisions 112, and a NO answer to decision 114, cause instructions 119 to display the message: "PASSED TEST * RELEASE BRAKE". Finally, instructions 120 print the results of: the calculated brake imbalance, the total axle weight, and the maximum brake force and rolling resistance values, to end the axle test sub-routine.

With the end of the first axle test, instruction 122 performs the same auto zero routine (62) prior to testing the next axle. Each test uses the same axle test subroutine 66, requiring placement of each axle's wheels on the brake test rollers. This continues until the last (Nth) axle test in instructions 124–128.

Following all axle tests, the vehicle's parking brake is tested. Once again the same axle subroutine 66 is used to determine the parking brake force values. Beginning with instructions 132, which displays the message: "PARKING BRAKE TEST * PLACE REAR WHEELS ON TESTER", and following with instructions 132 which executes the test (with the exception of imbalance).

The sequence illustrated assumes that the parking brake does act on the rear wheels; the most common occurrence. However, in some vehicles the parking brake may function with another axle or, as in the case of multi axle vehicles, the parking brake may act on more than one axle. In this case the test routine is modified to account for the added testing of each parking brake axle.

When all of the brake tests are completed, instructions 134 print the summary vehicle test report, which is optional since each axle test is printed. In some applications the summary vehicle test report may be preferred to the individual axle print outs. The computer exits the test at 138.

The brake test procedure of the present invention provides a quantitative test of a vehicle's brake system characteristics; automatically, in a procedure suitable for safety lane inspections. The elimination of the brake ovality characteristic prior to data analysis allows accurate determination of brake force imbalance in each axle.

Similarly, although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:
1. The method of testing the braking force of an axle of a vehicle, comprising the steps of:
positioning the axle's left side and right side wheels on left and right brake test apparatus of the type having rollers driven at constant speed by a variable magnitude torque signal;
actuating the vehicle's braking system with increasingly increasing applied force over a real time test interval;
sampling in pairs, periodically over the test interval, the magnitude of the left ($BK_l$) and right ($BK_l$) torque signals applied in near coincidence to the left and right brake test apparatus, and storing the sampled pair of coincident torque signal magnitudes;
filtering the left and right side values of each sampled pair of coincident torque signal magnitudes (i), from i=1 to Q, using the following algorithm

$$BK_i ave = \frac{\sum\limits_{n=i-K/2}^{n=i+K/2} BK_n}{K}$$

Where:

$BK_i$ ave = The summation value of $BK_n$

K = The number of sampled pairs of coincident torque signal magnitudes per tire revolution to produce filtered pairs of coincident torque signal magnitudes;

reporting, as a maximum brake force value for the axle, the maximum one of the left and right side sum values of said filtered pairs of coincident torque signal magnitudes; and indicating, as the axle brake force imbalance, the maximum one of the left and right difference values of said filtered pairs of coincident torque signal magnitudes.

2. The method of claim 1, wherein said step of indicating the maximum imbalance from among the plurality (i) of filtered pairs of coincident torque signal magnitudes of left torque signal values ($BK_l$) and right torque signal values ($BK_r$), includes determining the maximum value of the following algorithm for samples i=1 to Q $$\frac{Delta\_BK_i}{BF_{max}} \cdot \left[\frac{BF_{max}}{BK_i}\right]^{\frac{1}{2}}$$

where:

$BK_i = BK_l i + BK_r i$ $BF_{max}$ = The maximum value of $BK_l i = BK_r i$ for i=1 to Q Delta_BK = The slope (rate of change) for $BK_i$.

* * * * *

UNITED STATES PATENT AND TRADEMARK OFFICE
CERTIFICATE OF CORRECTION

PATENT NO. : 4,893,242

DATED : January 9, 1990

INVENTOR(S) : John N. Rogers, James M. Lady
Donald W. Bilsbarrow and Rene S. Trujillo It is certified that error appears in the above-identified patent and that said Letters Patent is hereby corrected as shown below:

Column 5, line 7, "BK)," should read --$BK_r$)--.

Column 5, line 39, "$Delta_{13}$ BK" should read --Delta_BK--.

Claim 1, Column 6, line 60 "($BK_1$)" should read --($BK_r$)--.

Signed and Sealed this

Thirtieth Day of June, 1992

Attest:

DOUGLAS B. COMER

*Attesting Officer*  *Acting Commissioner of Patents and Trademarks*